US011492134B2

(12) United States Patent
Rallabhandi (10) Patent No.: US 11,492,134 B2
(45) Date of Patent: Nov. 8, 2022

(54) SYSTEM AND METHOD FOR PERFORMING MULTI-POINT, FULL-MISSION SONIC BOOM PREDICTION

(71) Applicant: UNITED STATES OF AMERICA AS REPRESENTED BY THE ADMINISTRATOR OF NASA, Washington, DC (US)

(72) Inventor: Sriram K. Rallabhandi, Glen Allen, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 458 days.

(21) Appl. No.: 16/704,910

(22) Filed: Dec. 5, 2019

(65) Prior Publication Data

US 2020/0180780 A1 Jun. 11, 2020

Related U.S. Application Data

(60) Provisional application No. 62/776,682, filed on Dec. 7, 2018.

(51) Int. Cl.
*B64D 43/02* (2006.01)
*G06F 30/15* (2020.01)
*G06F 30/28* (2020.01)
*G06F 119/10* (2020.01)

(52) U.S. Cl.
CPC .............. *B64D 43/02* (2013.01); *G06F 30/15* (2020.01); *G06F 30/28* (2020.01); *G06F 2119/10* (2020.01)

(58) Field of Classification Search
CPC ......... B64D 43/02; G06F 30/15; G06F 30/28; G06F 2119/10; G06F 2113/28; G06F 30/20
See application file for complete search history.

(56) References Cited

U.S. PATENT DOCUMENTS

| 7,530,266 | B2* | 5/2009 | Tillotson | G01N 29/024 |
| | | | | 73/170.16 |
| 2005/0098681 | A1* | 5/2005 | Berson | G08G 5/0052 |
| | | | | 244/1 N |
| 2017/0132356 | A1* | 5/2017 | Shen | B64C 30/00 |

FOREIGN PATENT DOCUMENTS

EP 1970683 A2 * 9/2008 ............. G01H 17/00

OTHER PUBLICATIONS

Rallabhandi, S. K., "Advanced Sonic Boom Prediction using the Augmented Burgers Equation", Journal of Aircraft, pp. 1245-1253, vol. 48, Issue 4.
Rallabhandi, et al., "Sonic-Boom Mitigation Through Aircraft Design and Adjoint Methodology", Journal of Aircraft, pp. 502-510, vol. 51, Issue 2.

(Continued)

*Primary Examiner* — Steven W Crabb
(74) *Attorney, Agent, or Firm* — Jennifer L. Riley; Robin W. Edwards; Helen M. Galus (57) ABSTRACT

A high-fidelity, multi-point, full-mission sonic-boom propagation tool that includes functionality to handle aircraft trajectories and maneuvers, as well as, all relevant noise metrics at multiple points along the supersonic mission. This allows efficient computation of sonic-boom loudness across the entire supersonic mission to allow pilots and aircraft operators to plan the aircraft flight path to manage the sonic boom footprint.

15 Claims, 8 Drawing Sheets

(56) References Cited

OTHER PUBLICATIONS

Rallabhandi, S. K., "Application of Adjoint Methodology to Supersonic Aircraft Design Using Reversed Equivalent Areas", Journal of Aircraft, 2014, pp. 1873-1882, vol. 51, Issue 6.

Rallabhandi, S. K., et al., "Uncertainty Analysis and Robust Design of Low-Boom Concepts Using Atmospheric Adjoints", Journal of Aircraft, Jun. 2017, pp. 902-917, vol. 54, Issue 3.

Rallabhandi, S. K, et al., "Adjoint-Based Mesh Adaptation for the Sonic Boom Signature Loudness", AIAA 2017, pp. 1-21.

Rallabhandi, S. K., "Sonic Boom Prediction and Mitigation using Three-Dimensional Earth Effects", AIAA, 2018, pp. 1-21.

\* cited by examiner

FIG. 5

SYSTEM AND METHOD FOR PERFORMING MULTI-POINT, FULL-MISSION SONIC BOOM PREDICTION

CROSS-REFERENCE TO RELATED PATENT APPLICATION(S)

The present application is a nonprovisional U.S. application that claims the benefit of, and priority to, the filing date of U.S. provisional application Ser. No. 62/776,682, filed on Dec. 7, 2018 and entitled "sBOOMTraj: A high-fidelity multi-point full-mission sonic-boom propagation tool," which is hereby incorporated by reference herein in its entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Supersonic flight's biggest challenge remains mitigation of sonic boom to levels where the noise footprint from supersonic cruise is considered acceptable to humans and building structures. Sonic boom prediction tools have been around since the 1960 s. Most of the numerical methods developed during the earlier phases of commercial supersonic aircraft research were based on the linear theory concepts laid out originally by Whitham, G., in "The Flow Pattern of a Supersonic Projectile," Communications on Pure and Applied Mathematics, Vol. 5, No. 3, 1952, pp. 301-347, and later by Hayes, W. D., in "Brief Review of Basic Theory: Sonic Boom Research," NASA SP147, 1967, pp. 3-7.

The initial computer programs rested heavily on this theory. Several new codes have come about in later years (e.g., PCBOOM), but the underlying physics of boom propagation was based on linear and weak shock theory given by Whitham. Since the prediction was based on linear theory, the sonic boom minimization theory, originally proposed by Seebass and George in "Sonic Boom Minimization," Journal of the Acoustical Society of America, Vol. 51, No. 2, 1972, pp. 686-694, and later and later extended by several others, has also been based on linear theory.

The main drawback of linear theory and weak shock assumption is its inability to predict the shock rise times. The predicted ground signatures using traditional approaches represent the shocks as discontinuous jumps. However, during the calculation of the frequency spectrum and, subsequently, the noise metrics (most importantly perceived loudness), one has to resort to empirical or numerical shock thickening to quantify and compare the impact of ground signatures. This shock thickening is essential, because fast Fourier transforms (FFT) and other numerical techniques, required in the computation of any loudness metric, cannot be applied to waveforms with shock discontinuities.

The shock thickening process is prone to error, because rise times calculated by this process are heavily dependent on the empirical or numerical factors chosen for converting the discontinuous shocks into continuous profiles. Furthermore, there is the unanswered question with regard to shock merging: namely, if two shocks are close by in the predicted ground signature, when should they be merged into a single shock during the thickening process? A common solution to this depends on the parameters chosen by the designer. Unfortunately, shock thickening and merging processes produce loudness and other noise metrics that may not be accurate. During optimization exercises, it is the tendency of the optimizer to exploit the shock merging process to its advantage. This is problematic, because the optimized loudness values may not be as optimistic as the optimizer believes they are.

To overcome these problems, several researchers in the past have looked at boom prediction methods that calculate the rise times without resorting to weak shock theory and area balancing techniques. These methods are based on solutions to the augmented Burgers equation. In essence, the regular Burgers equation is augmented with absorption, molecular relaxation, atmospheric stratification, and spreading terms, in addition to the nonlinear term from the regular equation. Some methods have used time domain to perform nonlinear corrections to the pressure waveform during propagation, and some have used the frequency domain to account for the dissipation and relaxation. Frequent conversion from time domain to frequency domain and back during atmospheric propagation may allow numerical errors to occur. Even if the numerical errors can be bounded, frequent FFT and inverse FFT operations add an additional overhead during the propagation process.

To overcome these issues, the inventor of the present application developed a sonic-boom propagation system known as "sBoom" that is capable of predicting shock thicknesses analytically. This system is described in an article titled "Advanced Sonic Boom Prediction Using the Augmented Burgers Equation," published in Journal Of Aircraft, Vol. 48, No. 4, July-August 2011, which is hereby incorporated by reference herein in its entirety. The sBoom system uses a time domain algorithm to account for all of the propagation mechanisms and is an extension of the algorithm presented by R. O. Cleveland and described in a Ph.D. thesis titled "Propagation of Sonic Booms Through a Real, Stratified Atmosphere," Ph.D. Thesis, Univ. of Texas at Austin, Tex. 1995.

The extensions to the prior algorithm that were provided by the sBoom system include: 1) the ability to handle different input waveforms: either an offbody dp/p pressure waveform or an F function generated, perhaps from boom minimization theory or an equivalent area distribution used in design exercises; 2) the ability to predict ground signatures in the presence of horizontally stratified wind profiles; 3) the ability to handle nonstandard atmospheres if needed, in which case users can provide temperature, wind, and relative humidity distributions; 4) prediction of offtrack signatures; 5) the prediction of ground intersection location with respect to the aircraft location, as well as time taken for the pressure disturbance to reach the ground.

BRIEF SUMMARY OF THE INVENTION

The present invention is directed to a new sBoom system and method that provide functionality and capabilities that were not included in the earlier versions of the sBoom system. The new sBoom system is a high-fidelity, multi-point, full-mission sonic-boom propagation tool. The new system includes functionality to handle aircraft trajectories and maneuvers as well as all relevant noise metrics at multiple points along the supersonic mission. This allows efficient computation of sonic-boom loudness across the entire supersonic mission to allow pilots and aircraft operators to plan the aircraft flight path to manage the sonic boom footprint.

The sBoom system can include memory and a processor configured to perform a sonic boom prediction algorithm. First processing logic of the processor is configured to receive input comprising computational fluid dynamics (CFD) flight data, atmospheric inputs, flight conditions and aircraft trajectory information. Second processing logic of the processor is configured to process the input to determine a number of trajectory points, numtraj, and a number of azimuthal angles, numphis, where numtraj and numphis are greater than one. Third processing logic of the processor is configured to process the input over all of the trajectory points, numtraj, and all of the azimuthal angles, numphis, to determine an extent of a sonic boom primary carpet and sonic-boom loudness levels at multiple trajectory points over a supersonic mission of the aircraft.

The sBoom method can include receiving input comprising CFD flight data, atmospheric inputs, flight conditions and aircraft trajectory information; processing the input to determine a number of trajectory points, numtraj, and a number of azimuthal angles, numphis, where numtraj and numphis are greater than one; and processing the input over all of the trajectory points, numtraj, and all of the azimuthal angles, numphis, to determine an extent of a sonic boom primary carpet and sonic-boom loudness levels at multiple trajectory points over a supersonic mission of the aircraft.

In accordance with an embodiment in which the method is implemented in software and/or firmware, the software and/or firmware includes a computer program for performing sonic boom prediction for an aircraft. The computer program can include computer instructions for execution by a processor. The computer instructions are embodied on a non-transitory computer-readable medium and can include a first set of instructions for receiving input comprising computational fluid dynamics (CFD) flight data, atmospheric inputs, flight conditions and aircraft trajectory information; a second set of instructions for processing the input to determine a number of trajectory points, numtraj, and a number of azimuthal angles, numphis, where numtraj and numphis are greater than one; and a third set of instructions for processing the input over all of the trajectory points, numtraj, and all of the azimuthal angles, numphis, to determine an extent of a sonic boom primary carpet and sonic-boom loudness levels at multiple trajectory points over a supersonic mission of the aircraft.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The example embodiments are best understood from the following detailed description when read with the accompanying drawing figures. It is emphasized that the various features are not necessarily drawn to scale. In fact, the dimensions can be arbitrarily increased or decreased for clarity of discussion. Wherever applicable and practical, like reference numerals refer to like elements.

DETAILED DESCRIPTION OF THE INVENTION

A new sBoom system is disclosed herein that includes functionality and capabilities that were not included in the earlier versions of the sBoom system. For example, the earlier versions of the sBoom system performed a single-point analysis, i.e., an analysis at a single point in supersonic climb or cruise. The new sBoom system is a high-fidelity, multi-point, full-mission sonic-boom propagation tool. The new system includes functionality to handle aircraft trajectories and maneuvers as well as all relevant noise metrics at multiple points along the supersonic mission. This allows efficient computation of sonic-boom loudness across the entire supersonic mission to allow pilots and aircraft operators to plan the aircraft flight path to manage the sonic boom footprint.

A few representative embodiments of the diagnostic tool and method will now be described with reference to FIGS. 1-5, in which like reference numerals represent like components, elements or features. It should be noted that features, elements or components in the figures are not intended to be drawn to scale, emphasis being placed instead on demonstrating inventive principles and concepts. Hence, specific dimensions and other physical characteristics relating to the embodiments disclosed herein are not to be considered as limiting, unless the claims expressly state otherwise. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. The term "approximately" means to within an acceptable limit or amount to one of ordinary skill in the art.

The terms "memory," "memory device" or "memory system," as those terms are used herein, are intended to denote a non-transitory computer-readable storage medium that is capable of storing computer instructions, or computer code, for execution by one or more processors. References herein to "memory," "memory device" or "memory system," should be interpreted as one or more memories, memory devices or memory systems. The memory can, for example, be multiple memories within the same computer system. The memory can also be multiple memories distributed amongst multiple computer systems or computing devices.

A "processor," "processing device," or "processing logic," as those terms are used herein, are interchangeable and encompass at least one electronic device that is configured to perform one or more processing algorithms that process signals. The electronic device(s) can perform the algorithm(s) in hardware, software or firmware, or a combination thereof. References herein to a system comprising "a processor" or "a processing device" or "processing logic" should be interpreted as one or more processors or processing cores. The processor can for instance, be a multi-core processor. A processor can also refer to a collection of processors within a single computer system or distributed amongst multiple computer systems. Instructions of a computer program can be performed by a single processor or by multiple processors that can be within the same device or that can be distributed across multiple devices. The term "controller," as that term is used herein, denotes an electronic device that includes a processor, a processing device or processing logic, as those terms are defined herein.

The new sBoom system disclosed herein is referred to hereinafter as the sBoomTrajectory (Traj) system, or the sBoomTraj system, to distinguish it from the earlier versions of the sBoom system. The sBoomTraj system disclosed herein shares some common features and functionality with the earlier sBoom system described in the aforementioned article by the inventor entitled "Advanced Sonic Boom Prediction Using the Augmented Burgers Equation," published in Journal Of Aircraft, Vol. 48, No. 4, July-August 2011, which is referred to hereinafter as "the Publication." For example, Sections II-IV of the Publication discuss an approach to solving the augmented Burgers equation entirely numerically in the time domain using an algorithm that performs the operations of Equations 1-9 of the Publication. In accordance with an embodiment, the sBoomTraj system takes a similar approach, but modifies the approach to achieve a multi-point evaluation with additional functionality. In the interest of brevity, the approach described in sections II-IV of the Publication are not reiterated herein.

In addition to the aforementioned extensions 1-5 of the sBoom system, the sBoomTraj system provides a number of extensions, including, but not limited to: 6) prediction of lateral cut-off locations; 7) prediction of focus boom locations; 8) ability to interface with other stand-alone tools to predict the magnitude of focus, post-focus and evanescent booms; 9) prediction of locus of focus locations; 10) computation of loudness or noise metrics along with sonic boom ground pressure profile (the flight trajectory, and sonic boom prediction are tightly integrated); 11) inclusion of mean-flow atmospheric effects due to propagation in a moving medium; 12) prediction of focus booms with low and high-fidelity as the aircraft accelerates to supersonic conditions; and 13) multi-point prediction, i.e., prediction of sonic boom loudness across the entire supersonic mission of the aircraft.

Extension 13 allows pilots and aircraft operators to plan the aircraft flight path to manage the sonic boom footprint. As indicated above, the biggest challenge to supersonic flight remains mitigation of sonic boom to levels at which the noise footprint from supersonic cruise is considered acceptable to humans. There are currently no commercially-operated supersonic aircraft due to a Federal Aviation Administration (FAA) ban on such operations, primarily because of the sonic boom they generate. In the past decade or so, significant advances have been made in numerical and computational tools that enable development of aircraft designs that can be demonstrated to mitigate sonic boom to such an extent that the ban can be suitably modified to allow commercial supersonic operations, provided their sonic boom impact is shown to be acceptable. Because extension 13 allows the sonic boom loudness to be predicted across the entire supersonic mission of the aircraft, flight paths can be chosen and/or aircraft operated in a way that prevents unacceptable levels of sonic boom loudness from occurring in areas populated by humans.

NASA's Commercial Supersonic Technology (CST) Project is aimed at providing the research and leadership to enable the development of a new generation of supersonic civil transport aircraft. The project's near-term objective is to develop tools and integrated concepts that will enable demonstration of overland supersonic flight with acceptable sonic boom. The current regulatory prohibition of flight that produces a sonic boom over populations is viewed as the principal barrier to future supersonic civil aviation. A key element of the CST Project is experimental flight validation of predictive methods, concepts, and techniques. As such, the ability of the sBoomTraj system to predict sonic booms with appropriate modeling and level of physics will help overcome the current regulatory ban and usher in a new era in commercial supersonic flight.

Figure 1:
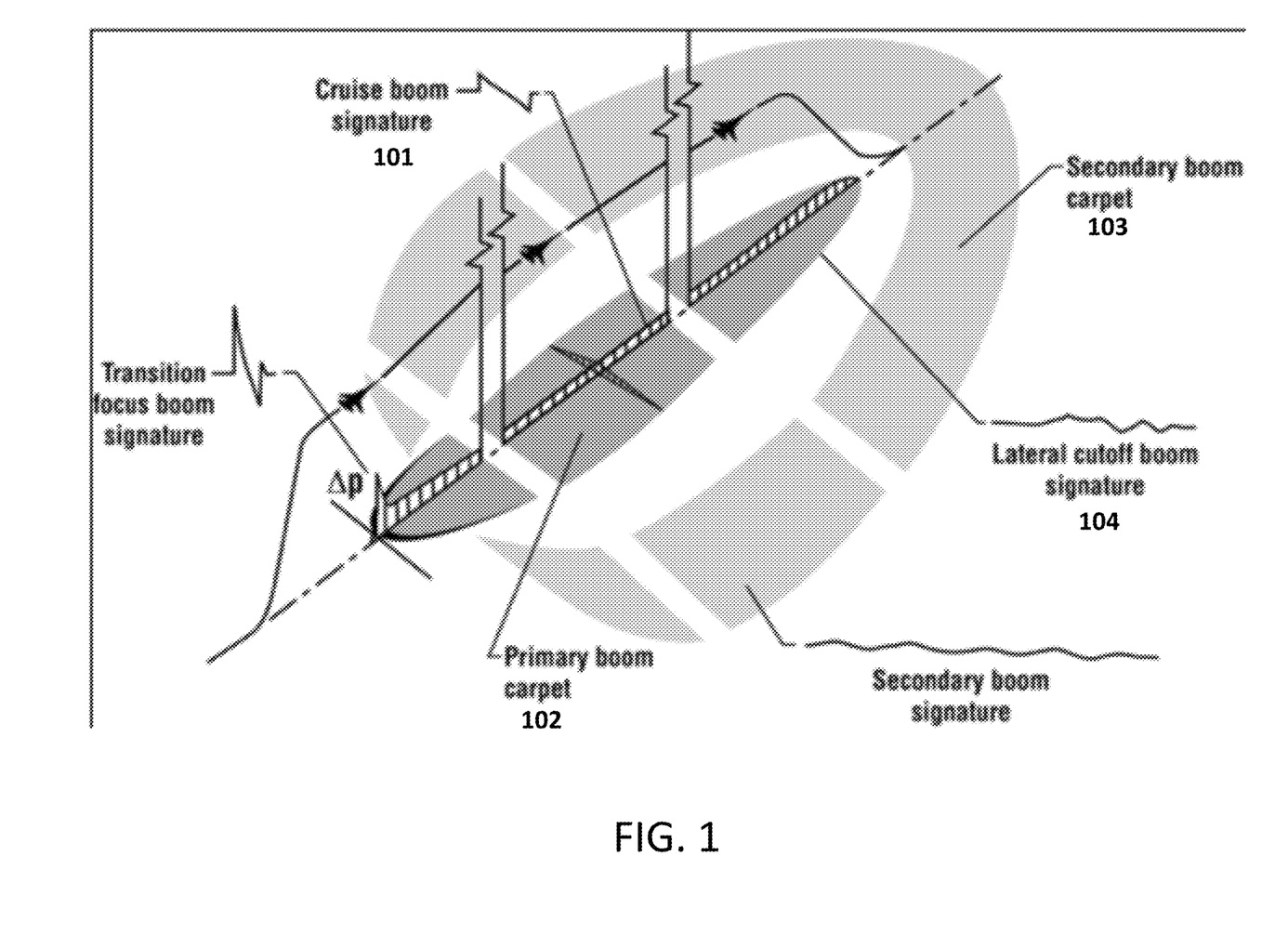
FIG. 1 is a pictorial illustration of sonic boom for a supersonic mission that shows the relationship between the primary and secondary sonic boom carpets.

FIG. 1 is a pictorial illustration of sonic boom for a supersonic mission that shows the relationship between the primary and secondary sonic boom carpets. A transition focus beam signature is produced by pressure disturbances that occur at the transition of the aircraft from sub-supersonic speeds to supersonic speeds, i.e., speeds in excess of the speed of sound. A cruise boom signature 101 is produced by the pressure disturbances in the air while the aircraft maintains supersonic speeds. While traveling at supersonic speeds, pressure disturbances created by the aircraft traveling through the air generate a primary boom carpet 102 and a secondary boom carpet 103. The primary boom carpet 102 is the loudest, and therefore that is where most aircraft design is focused. The sBoomTraj system is capable of predicting the lateral boom cutoff signature 104 and sonic boom loudness at multiple points over the entire primary boom carpet 103 over the entire supersonic mission, as will now be described with reference to FIGS. 2-5.

Figure 2:
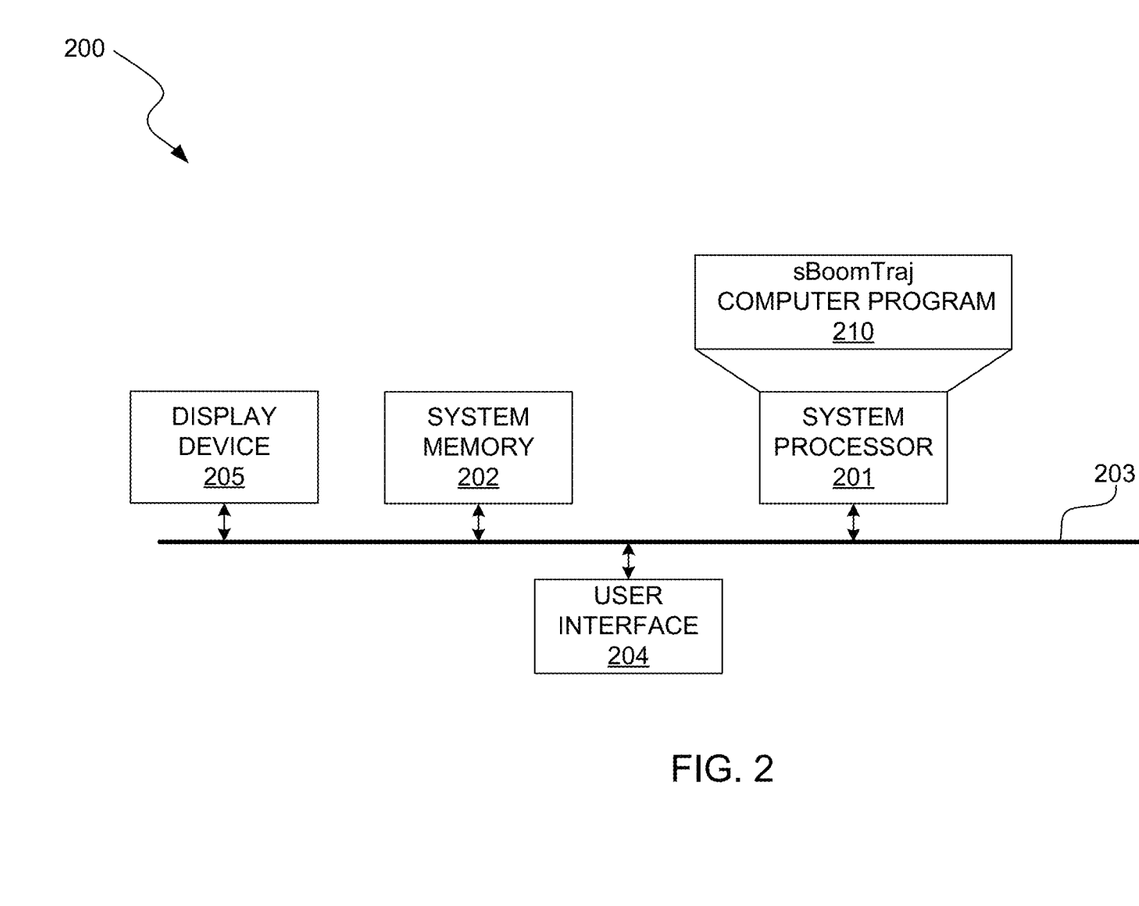
FIG. 2 is a block diagram of the sBoomTraj system in accordance with a representative embodiment.

FIG. 2 is a block diagram of the sBoomTraj system 200 in accordance with a representative embodiment. The sBoomTraj system 200 is typically implemented in software running on a computer, which can be, for example, a personal computer (PC). The computer is represented in FIG. 2 by a system processor 201, a system memory 202 and a system bus 203. The system 200 typically also includes a user interface (UI) 204 and a display device 205. The system memory 202 stores files and computer instructions for execution by the system processor 201. Although a single system processor 201 and a single system memory 202 are shown in FIG. 2, the sBoom system 200 can include multiple processors or processing cores and/or multiple memory devices. The system processor 201 executes an sBoomTraj computer program 210, which will now be described with reference to the flow diagram shown in FIGS. 3-4D in accordance with a representative embodiment.

Figure 3:
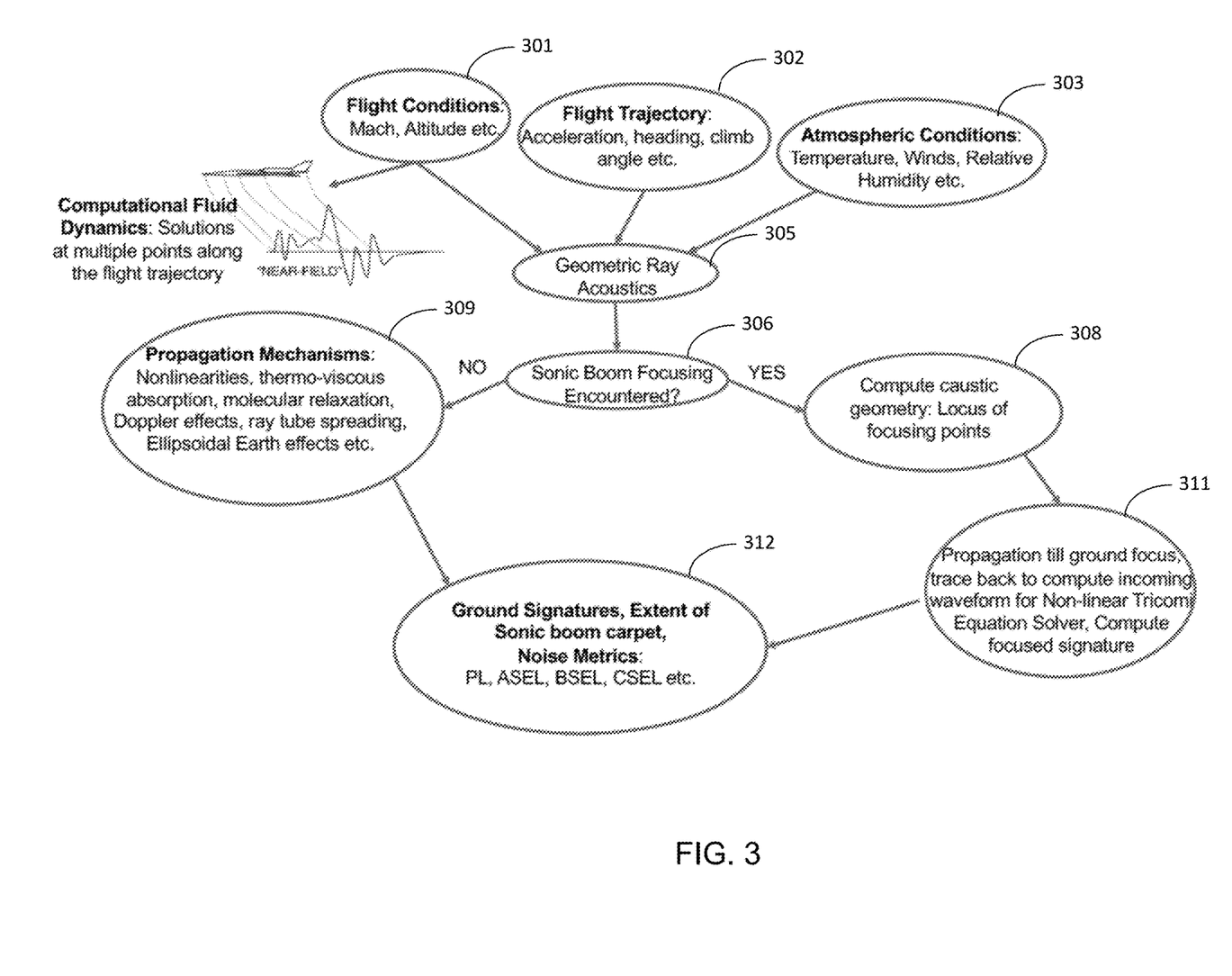
FIG. 3 is a flow diagram generally depicting the input to the sBoomTraj system shown in FIG. 2 and the functionality of the sBoomTraj system shown in FIG. 2 in accordance with a representative embodiment.

FIG. 3 is a flow diagram generally depicting the input to the system 200 shown in FIG. 2 and the functionality of the system 200 in accordance with a representative embodiment. FIGS. 4A-4D are flow diagrams that also represent the functionality of the system 200, but with greater granularity than the flow diagram shown in FIG. 3. The program 210 first reads computational fluid dynamics (CFD) flight data (near-field disturbance), flight conditions, atmospheric inputs, aircraft trajectory, etc., from the file system. The file system can be the system memory 202 shown in FIG. 2 or some other storage system accessible by the system processor 201. The program 210 also reads multiple command line arguments to dictate how sBOOMTraj runs. The user inputs the command line arguments to the system 200 via the UI 204. Blocks 301-303 represent this data being read by the system processor 201 from the system memory 202 or some other storage system.

Block 305 represents the program 210 processing all of this data to perform geometric ray acoustics computations. Wave propagation through the atmosphere is carried out using geometric acoustics and ray tracing. Several previous studies have documented the ray tracing aspect during boom propagation to the ground, without winds as well as with wind. Therefore, in the interest of brevity, the ray tracing algorithm will not be described. The manner in which the ray tracing algorithm can be performed is described in the aforementioned Publication. It should be noted that other steps can be performed at block 305 and prior to moving from blocks 301 303 to block 305, as will be described below with reference to FIGS. 4A-4D.

At block 306, the program 210 uses the results of the ray tracing algorithm performed at block 305 to determine whether or not sonic boom focusing has been encountered, and if so, moves to block 308. If not, the program 210 moves to block 309. A block 308, the program 210 performs caustic geometry computations to determine the locus of any focusing points. The program 210 then moves to block 311 and performs propagation calculations to determine the location where the caustic surface hits the ground, sets up a computational domain for the non-linear Tricomi equation solver, retraces the propagation path to the edge of the computational domain, and computes the focused signature. The process then moves to block 312 where all of the results are presented, e.g., ground signatures, extent of sonic boom carpet, and noise metrics: perceived level of loudness (PL), A-weighted sound exposure level (ASEL), B-weighted sound exposure level (BSEL), C-weighted sound exposure level (CSEL), etc.

At block 309, i.e., when no sonic boom focusing has been encountered, the program 210 employs propagation mechanisms including waveform steepening based on propagation nonlinearity, a thermo-viscus absorption algorithm, a molecular relaxation algorithm, a ray tube spreading algorithm, an Ellipsoidal Earth effects algorithm, and a Doppler effects algorithm. The results of the performance of the algorithms represented by blocks 301-311 are shown in block 312. The program 210 can cause the results shown in block 312 to be displayed on the display device 205. The program 210 typically includes computer instructions for receiving commands entered by the user via the UI 204 to cause the results or subsets thereof to be displayed on the display device 205.

Figure 4A:
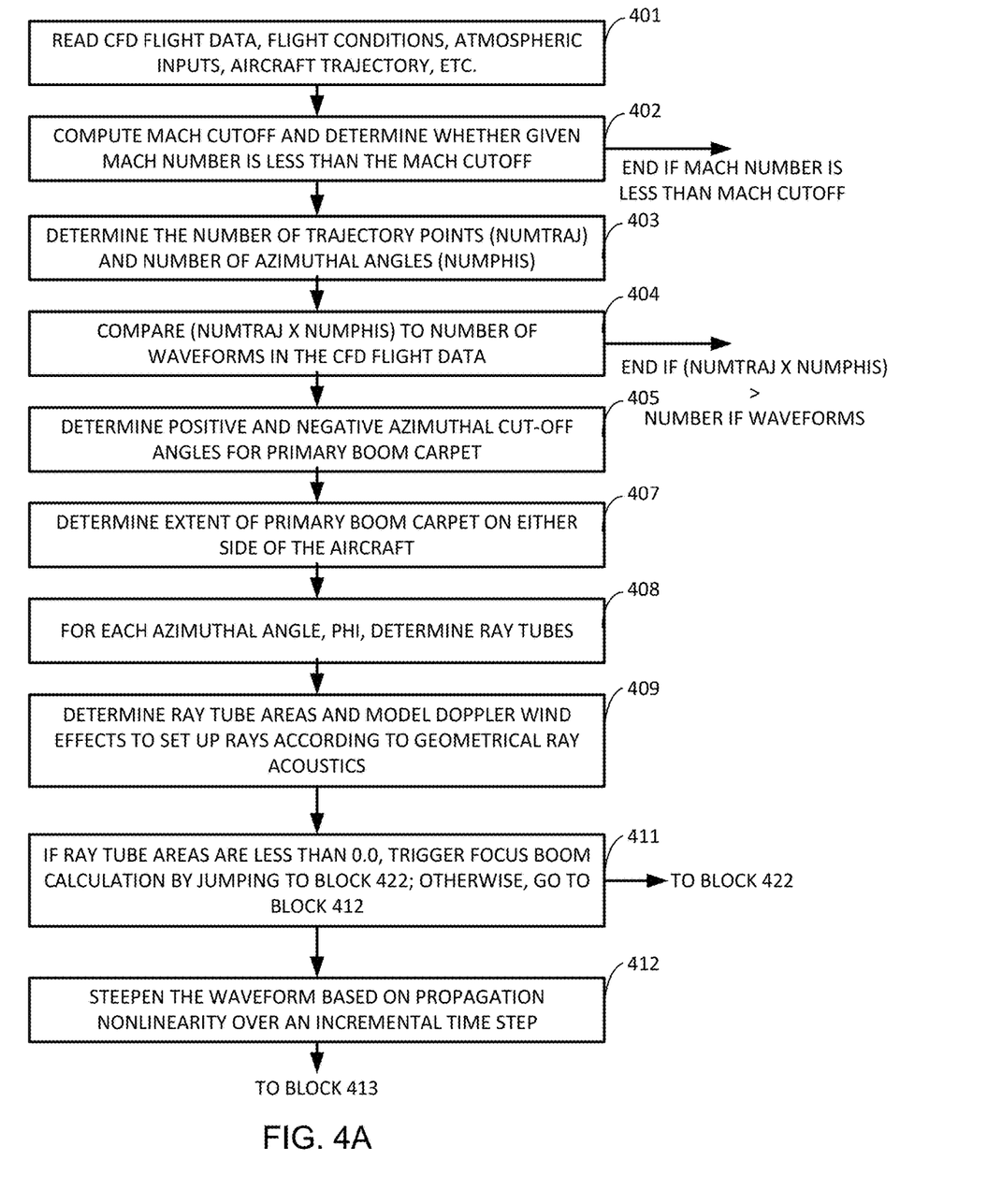
FIGS. 4A-4D are flow diagrams that represent the functionality of the sBoomTraj system shown in FIG. 2 with greater granularity than the flow diagram shown in FIG. 3.

FIGS. 4A-4D collectively show a flow diagram that represents the steps or processes performed by the program 210 in accordance with another representative embodiment with greater granularity than the flow diagram shown in FIG. 3. The program 210 first reads computational fluid dynamics (CFD) flight data (near-field disturbance), flight conditions, atmospheric inputs, aircraft trajectory, etc., from the file system (e.g., system memory 401). Block 401 corresponds to the three blocks 301-303 in FIG. 3. In accordance with a representative embodiment, the program 210 also reads multiple command line arguments to dictate how sBOOMTraj runs. The user inputs the command line arguments to the system 200 via the UI 204. Block 401 in FIG. 4A represents these steps of the system processor 201 reading all of this data and the command line arguments.

Block 402 represents computing the Mach Cutoff and deciding whether or not there is sonic boom by comparing the Mach Cutoff with the given Mach number of the aircraft. A decision is made that there is no sonic boom if the given Mach number is less than the Mach Cutoff. If the system 200 decides at block 402 that there is no sonic boom, the program 210 ends. Otherwise, the program moves to block 403.

At block 403, the program determines the number of trajectory points, numtraj, and the number of azimuthal angles, numphis, from the data read in at block 401, where numtraj and numphis are greater than one. At block 404, the program 210 decides whether the CFD flight data has (numtraj x numphis) waveforms. If not, the program 210 decides that proper input has not been provided, and ends, although it could instead inform the user that proper input has not been provided to prompt the user to provide proper input. If proper input has been provided, the program moves to block 405. Block 405 is the beginning of a main loop that is performed for all of the trajectory points (numtraj). The process is depicted below in pseudo code as processes 1.a-c. Process 1.c is a second loop nested inside the main loop that includes processes i-x. Process iv is a third loop nested inside of the second loop and includes processes 1-5. Process ix is a fourth loop nested inside of the second loop and includes processes 1-5. These loops and the processes performed in them will now be described with reference to the pseudo code below and the flow diagrams shown in FIGS. 4A-4D.

Figure 4B:
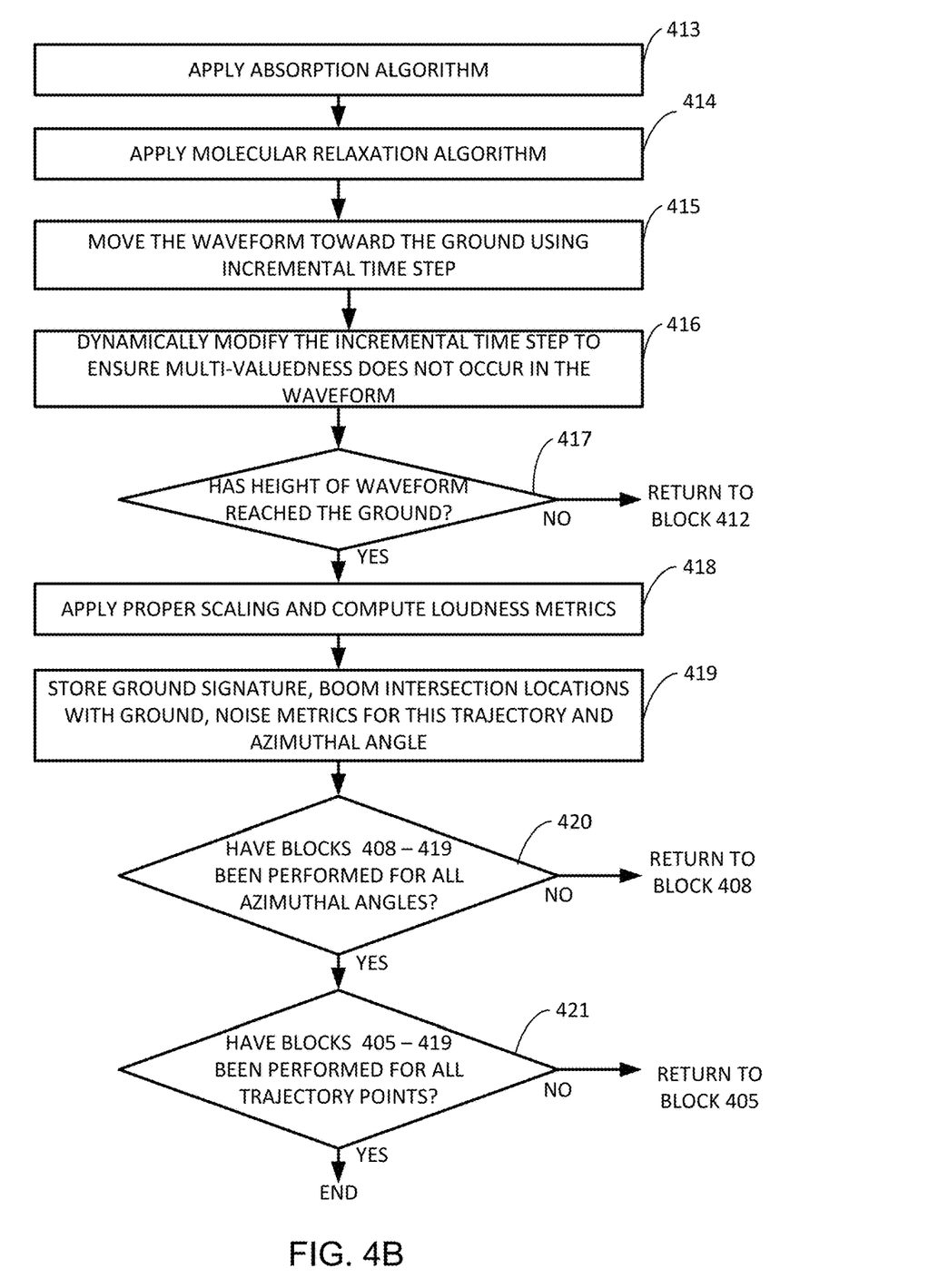
Figure 4C:
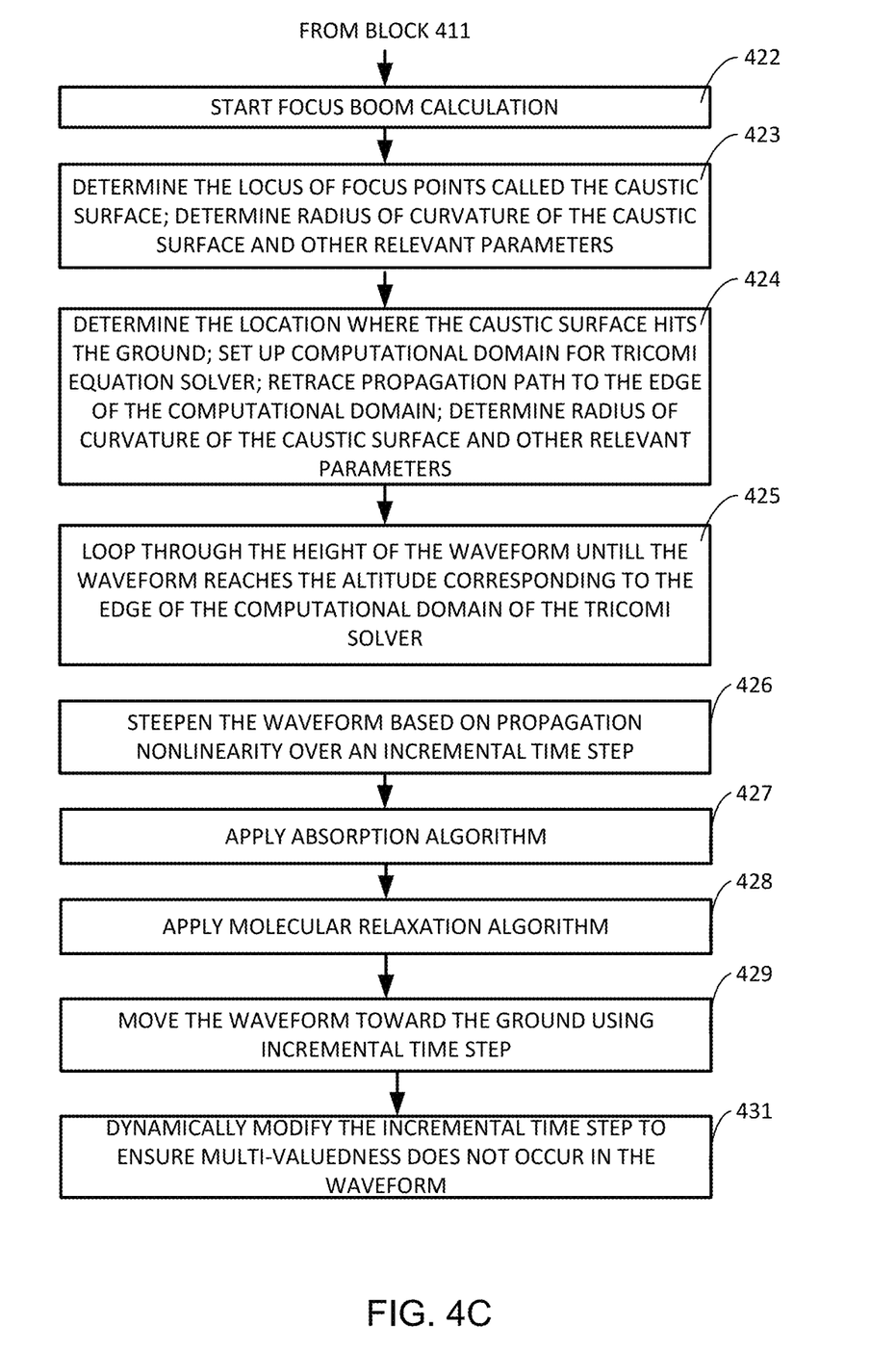
Figure 4D:
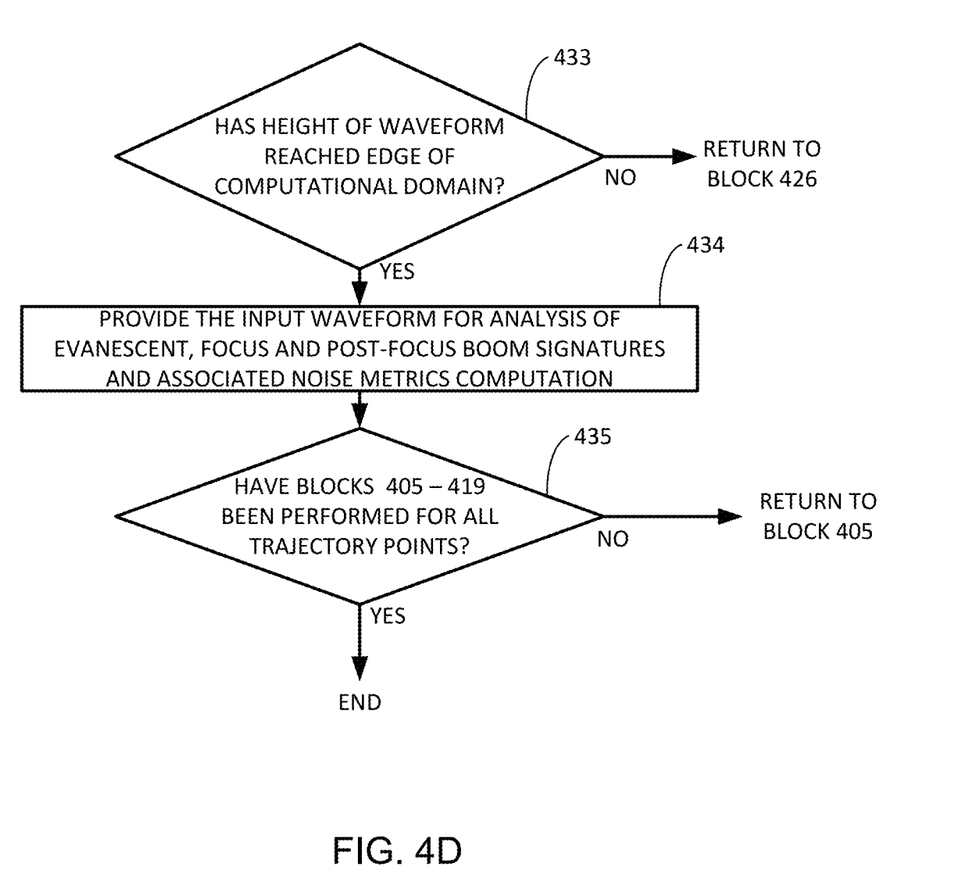

1. Main Loop: Loop over trajectory points (numtraj)
   a. Determine positive and negative azimuthal cut-off angles for primary boom carpet (BLOCK 405);
   b. Determine the extent of the primary boom carpet on either side of the aircraft (BLOCK 407);
   c. Second Loop: Loop over the prescribed azimuthal angles (numphis)
      i. For each azimuthal angle (phi), determine ray tubes (4 rays) (BLOCK 408);
      ii. Determine ray tube areas and model Doppler wind effects to set up rays according to geometrical ray acoustics (BLOCK 409);
      iii. If ray tube areas are less than 0.0, geometrical acoustics cannot handle those situations: trigger Focus Boom calculation and go to step vii (BLOCK 422); Otherwise go to step iv;
      iv. Third Loop: Loop through height of waveform till waveform reaches ground (BLOCK 417)
         1. Steepen the waveform based on propagation nonlinearity over an incremental time step (BLOCK 412);
         2. Apply absorption algorithm (BLOCK 413);

3. Apply molecular relaxation algorithm (BLOCK 414);
4. Move waveform toward the ground using the incremental time step (BLOCK 415);
5. Dynamically modify the incremental time step to make sure multi-valuedness does not occur in the waveform (BLOCK 416);

v. Once waveform reaches ground, or some user-specified altitude level, apply proper scaling, and compute loudness metrics (BLOCK 418);

vi. Store ground signature, boom intersection locations with the ground, noise metrics to disk for this trajectory point and azimuthal angle; Go to next azimuthal angle by going to step c above (BLOCK 408); If loop c has been performed for all azimuthal angles (BLOCK 420), then a determination is made at BLOCK 421 as to whether the main loop starting at BLOCK 405 has been performed for all trajectory points;

vii. Start focus boom calculation (BLOCK 422). If a decision is made at BLOCK 411 to trigger focus boom calculation, the process jumps to BLOCK 422. At BLOCK 423, the following processes are performed: determine locus of focus points called the caustic surface; determine radius of curvature of this caustic surface and other relevant parameters;

viii. Determine the location where the caustic surface hits the ground. Set up computational domain for the Tricomi solver; retrace propagation path to the edge of the computational domain (BLOCK 424);

ix. Fourth Loop: Loop through height of waveform till waveform reaches the altitude corresponding to the edge of the computational domain of the Tricomi solver (BLOCKs 425-433);
1. Steepen the waveform based on propagation non-linearity over an incremental time step (BLOCK 426)
2. Apply absorption algorithm (BLOCK 427)
3. Apply molecular relaxation algorithm (BLOCK 428)
4. Move waveform toward the ground using the incremental time step (BLOCK 429)
5. Dynamically modify the incremental time step to make sure multi-valuedness does not occur in the waveform (BLOCK 431); the loop continues until a decision is made at BLOCK 433 that the height of the waveform has reached the edge of the computational domain of the Tricomi equation solver.

x. Provide the input waveform for analysis of evanescent, focus and post-focus boom signatures and associated noise metric computation (BLOCK 434). If a decision is made at BLOCK 435 that the main loop has not been performed for all trajectory points, the process returns to block 405 and the main loop and nested loops continue to be performed.

As indicated above, earlier versions of the sBoom system performed single-point evaluations, which means only cruise boom was considered. In other words, the main loop that begins with BLOCK 405 and continues until evaluations have been performed for all of the trajectory points (Numtraj) and for all of the azimuthal angles (Numphis) is not included in the earlier versions. Processes 1.a and 1.b of the pseudo code correspond to extension 6) given above, i.e., prediction of lateral cut-off locations. Processes 1.c (portions vii, viii, ix and x correspond to extensions 7), 8) and 9), i.e., prediction of focus boom locations, ability to interface with other stand-alone tools to predict the magnitude of focus, post-focus and evanescent booms, and prediction of locus of focus locations.

It should be noted that the pseudo code and the flow diagrams of FIGS. 4A-4D are one representative embodiment for implementation of the sBoomTraj system. Different versions of sBoomTraj can include additional or different functionality not shown in the pseudo code or the flow diagrams while still achieving the same or similar results, as will be understood by those of skill in the art in view of the description provided herein. Also, some of the blocks shown in FIGS. 4A-4D can be rearranged and some are optional and can be eliminated, but are preferred.

In accordance with a representative embodiment, the sBoomTraj system 200 shown in FIG. 2 is incorporated into an aircraft cockpit display system to allow pilots to observe sonic booms in real-time during flight. For example, the sBoomTraj processes represented by the flow diagrams of FIGS. 4A-4D could be combined with NASA's Cockpit Interactive Sonic Boom Display Avionics (CISBoomDA) software to take real-time data from a supersonic aircraft and display the current sonic boom impact area and loudness levels in a cockpit environment. The current version of CISBoomDA integrates real-time weather data from multiple sources with sonic boom predictions using Digital Terrain Elevation Database (DTED) for real-time updates and provides instant feedback to pilots regarding the extent of sonic boom and its associated pressure levels. Based on a pre-selected pressure threshold, the carpet is characterized and displayed as either acceptable or not. If acceptable, the pilot would be guided along the planned flight track. If not acceptable, the pilot would be able to update the waypoint location for appropriate course corrections to obtain a satisfactory result.

While CISBoomDA in its current state is useful to keep booms off populated areas, incorporating the sBoomTraj system into CISBoomDA to include loudness level predictions with the information displayed in the cockpit environemtn will make it indispensable for future commercial supersonic aircraft to maintain quiet operations that can prescribe sonic boom levels to stay below some future FAA/ICAO decibel limit.

Figure 5:
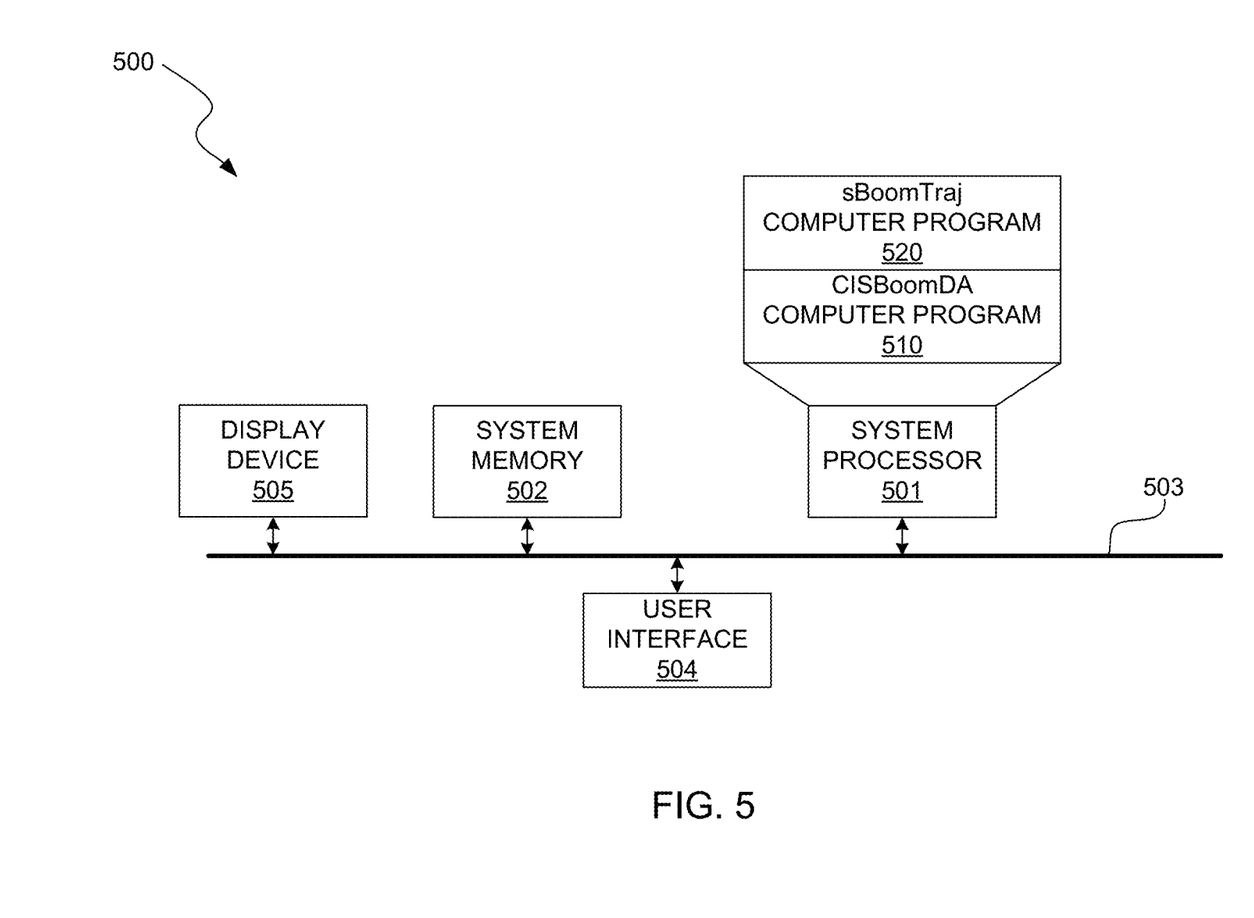
FIG. 5 is a block diagram of the sBoomTraj system in accordance with a representative embodiment incorporated into an aircraft cockpit display system to allow pilots to observe sonic booms in real-time during flight.

FIG. 5 is a block diagram of the sBoomTraj system 500 described above incorporated into an aircraft cockpit display system to allow pilots to observe sonic booms in real-time during flight. In accordance with this representative embodiment, the sBoomTraj computer program 520 is integrated with NASA's CISBoomDA computer program 510 to allow the functionality of the sBoomTraj system described above to be combined with the functionality that is currently available with CISBoomDA. It should be noted, however, that the sBoomTraj system 500 can be implemented in the cockpit environment without CISBoomDA or other systems.

In accordance with this representative embodiment, the sBoomTraj system 500 is implemented in software running on a computer, which, in this embodiment, is an avionics computer display system. The avionics computer display system is represented in FIG. 5 by a system processor 501, a system memory 502, a system bus 503, a UI 504 and a display device 505. The system memory 502 stores files and computer instructions for execution by the system processor 501. Although a single system processor 501 and a single system memory 502 are shown in FIG. 5, the system 500 can include multiple processors or processing cores and/or multiple memory devices. Likewise, although a single display device 505 is shown in FIG. 5 the system 500 can include, and typically does include, multiple display devices.

In accordance with this representative embodiment, the system processor 501 executes the CISBoomDA computer program 510 and the sBoomTraj computer program 520. Although these computer programs are shown in FIG. 5 as being separate computer programs, the combined functionality could be implemented as a single computer program. It should also be noted that although the sBoomTraj processes are described herein as being implemented in software, they could be implemented in software, hardware, firmware or any combination thereof. In embodiments where the sBoomTraj operations are implemented in software and/or firmware, the corresponding computer instructions can be stored on a suitable computer-readable medium, such as a solid state memory device (e.g., random access memory (RAM) read-only memory (ROM), programmable ROM (PROM), erasable PROM (EPROM), flash memory, etc.), optical memory devices and magnetic memory devices.

The preceding description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A system for performing sonic boom prediction for an aircraft to allow an aircraft operator to plan the aircraft's flight path to manage the aircraft's sonic boom footprint during flight, the system comprising:
   memory;
   a processor comprising logic configured to perform a sonic boom prediction algorithm, wherein the logic that performs the sonic boom prediction algorithm comprises:
      first processing logic configured to receive input comprising computational fluid dynamics (CFD) flight data, atmospheric inputs, flight conditions and aircraft trajectory information;
      second processing logic configured to process the input to determine a number of trajectory points, numtraj, and a number of azimuthal angles, numphis, where numtraj and numphis are greater than one; and
      third processing logic configured to process the input over all of the trajectory points, numtraj, and all of the azimuthal angles, numphis, to determine an extent of a sonic boom primary carpet and sonic-boom loudness levels at multiple trajectory points over a supersonic mission of the aircraft wherein to determine the extent of a sonic boom primary carpet and sonic-boom loudness levels at multiple trajectory points over a supersonic mission of the aircraft the third processing logic includes
         logic configured to determine positive and negative azimuthal cut-off angles for the sonic boom primary carpet; and
         logic configured to determine an extent of the sonic boom primary carpet on either side of the aircraft based on the positive and negative azimuthal cut-off angles; and
   a display for displaying a current sonic boom prediction for the aircraft to the aircraft operator in real-time, wherein when the current sonic boom prediction is above a predetermined threshold level, the aircraft operator performs a course correction for the aircraft to obtain an acceptable sonic boom prediction that is below the predetermined threshold level.

2. The system of claim 1, wherein the third processing logic further comprises:
   logic configured to determine, for each azimuthal angle, phi, ray tubes to be used in a geometrical ray acoustics algorithm; and
   logic configured to determine, for each azimuthal angle phi, ray tube areas and model Doppler wind effects to set up rays according to the geometrical ray acoustics algorithm.

3. The system of claim 2, wherein the geometrical ray acoustics algorithm is performed for each azimuthal angle and comprises steps of:
   a. steepening a waveform associated with the ray tube areas based on propagation nonlinearity over a preselected incremental time step;
   b. applying a thereto-viscous absorption algorithm to the waveform;
   c. applying a molecular relaxation algorithm to the waveform;
   d. moving the waveform toward the ground using the preselected incremental time step;
   e. dynamically modifying the preselected incremental time step to prevent multi-valuedness from occurring in the waveform; and
   repeating steps a.-e. until the waveform reaches the ground or a user-specified altitude level.

4. The system of claim 3, wherein the third logic further comprises:
- logic configured to apply scaling and compute loudness metrics when the waveform reaches the ground or a user-specified altitude level to obtain ground signatures, sonic boom intersection locations with the ground and loudness metrics; and
- logic configured to store the ground signatures, sonic boom intersection locations with the ground and the loudness metrics in memory.

5. The system of claim 2, further comprising:
- logic configured to determine, prior to the logic determining ray tube areas and model Doppler wind effects to set up rays, whether or not to trigger a focus boom calculation; and
- logic configured to perform a focus boom calculation if a determination is made to trigger the focus boom calculation.

6. The system of claim 5, wherein the logic performs the focus boom calculation by performing a focus boom calculation algorithm comprises steps of:
- a. steepening a waveform associated with the ray tube areas based on propagation nonlinearity over a preselected incremental time step;
- b. applying a thermo-viscous absorption algorithm to the waveform;
- c. applying a molecular relaxation algorithm to the waveform;
- d. moving the waveform toward the ground using the preselected incremental time step;
- e. dynamically modifying the preselected incremental time step to prevent multi-valuedness from occurring in the waveform; and
- repeating steps a.-e. until the waveform reaches an edge of a computational domain of a Tricomi equation solver.

7. The system 6, further comprising:
- logic configured to perform analysis of evanescent, focus boom signatures and post-focus boom signatures after the waveform reaches the edge of the computational domain.

8. A method for performing sonic boom prediction for an aircraft to allow an aircraft operator to plan the aircraft's flight path to manage the aircraft's sonic boom footprint during flight, the method comprising:
- in a processor, performing a sonic boom prediction algorithm comprises:
- receiving input comprising computational fluid dynamics (CFD) flight data, atmospheric inputs, flight conditions and aircraft trajectory information;
- processing the input to determine a number of trajectory points, numtraj, and a number of azimuthal angles, numphis, where numtraj and numphis are greater than one; and
- processing the input over all of the trajectory points, numtraj, and all of the azimuthal angles, numphis, to determine an extent of a sonic boom primary carpet and sonic-boom loudness levels at multiple trajectory points over a supersonic mission of the aircraft, wherein processing to determine the extent of a sonic boom primary carpet and sonic-boom loudness levels at multiple trajectory points over a supersonic mission of the aircraft includes
  - determining positive and negative azimuthal cut-off angles for the sonic boom primary carpet; and
  - determining an extent of the sonic boom primary carpet on either side of the aircraft based on the positive and negative azimuthal cut-off angles;
- determining a current sonic boom prediction using the determined extent of the sonic boom primary carpet and sonic-boom loudness levels;
- displaying the current sonic boom prediction for the aircraft to the aircraft operator in real-time, wherein when the current sonic boom prediction is above a predetermined threshold level, the aircraft operator performs a course correction for the aircraft to obtain an acceptable sonic boom prediction that is below the predetermined threshold level.

9. The method of claim 8, wherein the step of processing the input over all of the trajectory points, numtraj, and all of the azimuthal angles, numphis, to determine an extent of a sonic boom primary carpet and sonic-boom loudness levels at multiple trajectory points over a supersonic mission of the aircraft third processing logic further comprises:
- determining, for each azimuthal angle, phi, ray tubes to be used in a geometrical ray acoustics algorithm; and
- determining, for each azimuthal angle phi, ray tube areas and model Doppler wind effects to set up rays according to the geometrical ray acoustics algorithm.

10. The method of claim 9, wherein the geometrical ray acoustics algorithm is performed for each azimuthal angle and comprises steps of:
- a. steepening a waveform associated with the ray tube areas based on propagation nonlinearity over a preselected incremental time step;
- b. applying a thermo-viscous absorption algorithm to the waveform;
- c. applying a molecular relaxation algorithm to the waveform;
- d. moving the waveform toward the ground using the preselected incremental time step;
- e. dynamically modifying the preselected incremental time step to prevent multi-valuedness from occurring in the waveform; and
- repeating steps a.-e. until the waveform reaches the ground or a user-specified altitude level.

11. The method of claim 10, further comprising:
- after the waveform reaches the ground or a user-specified altitude level, applying scaling and computing loudness metrics to obtain ground signatures, sonic boom intersection locations with the ground and loudness metrics; and
- storing the ground signatures, sonic boom intersection locations with the ground and the loudness metrics in memory.

12. The method of claim 9, further comprising:
- prior to determining the ray tube areas and the model Doppler wind effects to set up rays, determining whether or not to trigger a focus boom calculation; and
- if a determination is made to trigger the focus boom calculation, performing the focus boom calculation.

13. The method of claim 12, wherein the focus boom calculation is performed by performing a focus boom calculation algorithm comprising steps of:
- a. steepening a waveform associated with the ray tube areas based on propagation nonlinearity over a preselected incremental time step;
- b. applying a thermo-viscous absorption algorithm to the waveform;
- c. applying a molecular relaxation algorithm to the waveform;

d. moving the waveform toward the ground using the preselected incremental time step;

e. dynamically modifying the preselected incremental time step to prevent multi-valuedness from occurring in the waveform; and repeating steps a.-e. until the waveform reaches an edge of a computational domain of a Tricomi equation solver.

14. The method of claim 8, further comprising steps of:

after the waveform reaches the edge of the computational domain, performing an analysis of evanescent boom signatures, focus boom signatures and post-focus boom signatures.

15. A computer program for performing sonic boom prediction for an aircraft to allow an aircraft operator to plan the aircraft's flight path to manage the aircraft's sonic boom footprint during flight, the computer program comprising computer instructions for execution by a processor, the computer instructions being embodied on a non-transitory computer-readable medium, the computer instructions comprising:

a first set of instructions for receiving input comprising computational fluid dynamics (CFD) flight data, atmospheric inputs, flight conditions and aircraft trajectory information;

a second set of instructions for processing the input to determine a number of trajectory points, numtraj, and a number of azimuthal angles, numphis, where numtraj and numphis are greater than one; and a third set of instructions for processing the input over all of the trajectory points, numtraj, and all of the azimuthal angles, numphis, to determine an extent of a sonic boom primary carpet and sonic-boom loudness levels at multiple trajectory points over a supersonic mission of the aircraft wherein processing to determine the extent of a sonic boom primary carpet and sonic-boom loudness levels at multiple trajectory points over a supersonic mission of the aircraft includes determining positive and negative azimuthal cut-off angles for the sonic boom primary carpet; and determining an extent of the sonic boom primary carpet on either side of the aircraft based on the positive and negative azimuthal cut-off angles;

a fourth set of instructions for displaying the current sonic boom prediction for the aircraft to the aircraft operator in real-time, wherein when the current sonic boom prediction is above a predetermined threshold level, the aircraft operator performs a course correction for the aircraft to obtain an acceptable sonic boom prediction that is below the predetermined threshold level.

* * * * *